United States Patent [19]

Misek

[11] Patent Number: 4,766,439
[45] Date of Patent: Aug. 23, 1988

[54] DIRECTION FINDING SYSTEM

[75] Inventor: Victor A. Misek, Hudson, N.H.

[73] Assignee: Sanders Associates, Inc., Nashua, N.H.

[21] Appl. No.: 571,770

[22] Filed: Jan. 18, 1984

[51] Int. Cl.$^4$ ............................................. G01S 5/04
[52] U.S. Cl. ................................. 342/445; 342/417; 342/373
[58] Field of Search ............... 343/445, 417, 432, 373, 343/383, 376, 442

[56] References Cited

U.S. PATENT DOCUMENTS

| | | | |
|---|---|---|---|
| 3,921,175 | 11/1975 | Hughes et al. | 342/432 |
| 3,946,388 | 3/1976 | Schifrine | 342/445 |
| 4,034,376 | 7/1977 | Barton | 342/444 |
| 4,209,791 | 6/1980 | Gerst et al. | 342/442 |
| 4,227,196 | 10/1980 | Langeraar | 342/444 |
| 4,229,740 | 10/1980 | Krilanovich | 342/445 |
| 4,245,333 | 1/1981 | Jelks | 342/373 X |
| 4,305,074 | 12/1981 | Barzana et al. | 342/100 |
| 4,380,010 | 4/1983 | Krajewski | 342/368 |
| 4,489,327 | 12/1984 | Eastwell | 342/432 |
| 4,528,567 | 7/1985 | Miles et al. | 342/442 |

Primary Examiner—Theodore M. Blum
Assistant Examiner—John B. Sotomayor
Attorney, Agent, or Firm—Richard I. Seligman

[57] ABSTRACT

An adcock DF-on-the-fly type direction finding system employing a beam forming dispersive delay line (BFDDL). A square array of four elements A1, B1, C1, and D1 with A1, C1 and B1, D1 being the diagonal pairs is used to input signals to combiner, shifter and summer elements to produce signals representing $S_\phi = A1 + B1 + C1 + D1$ and $S = (B1 - D1) + [(A1 - C1)$ shifted $-90°]$. $S_\phi$ and S are input to the BFDDL which produces output signals sampled from the output spatial interference pattern of the BFDDL at 90° intervals. The output signals from the BFDDL are used to calculate the arrival of the signal of interest as being substantially equal to the phase shift between $S_\phi$ and S.

6 Claims, 2 Drawing Sheets

DIRECTION FINDING SYSTEM

BACKGROUND OF THE INVENTION

The present invention relates to direction finding systems and, more particularly, to an adcock DF-on-the-fly type direction finding system employing a beam forming dispersive delay line.

Direction finding (DF) systems are well-known in the art and are typically employed to find the source of a radio frequency (RF) transmitter. For example, radio transmissions from enemy aircraft or vessels can be used to determine their presence and location while they are still beyond the limits of radar detection. RF responsive DF systems can also be used to pick out an individual member of a group detected by radar such as in the case of quickly locating a particular private plane within an airport's landing pattern.

Typically in such systems, an array of receiving elements is deployed in a known configuration so as to develop a plurality of respective electrical output signals as a result of receiving the RF signal of interest. These electrical signals are then processed to determine the angle of arrival of the RF signal that caused them. Such a system employing a linear array and surface accoustic wave (SAW) device for time compressing the signals from the elements of the array is shown in U.S. Pat. No. 4,245,333 to Jelks. In a so-called adcock DF-on-the-fly system, a square array of four elements is employed.

Other patents of relevance and interest to the subject matter of the present invention include U.S. Pat. No. 4,229,740 to Krilanovich; U.S. Pat. No. 3,946,388 to Schifrine; and U.S. Pat. No. 3,631,496 to Fink et al.

Typical prior art adcock DF systems are complex, costly, and have many sources of potential error such as temperature sensitivity induced phase and amplitude errors within the state-of-the-art components employed therein to reduce size as much as possible. A typical example is the SAW device of the above-referenced Jelks patent. A three dispersive line phasing system uses costly quartz lines which have poor sidelobe performance. A four dispersive line amplitude system requires the purchase of four matched lines.

Wherefore, it is the object of the present invention to provide a DF system with a reduction in components, simplification of octantal error reduction over a wide band, which reduces temperature induced variations in DF accuracy, and which reduces size and power consumption of apparatus.

It is a further object of the present invention to provide a DF system using a specially designed beam forming dispersive delay line to provide pulse compression and direction vectors from a single device, thus providing DF information on a large number of simultaneous signals over a wide band of frequencies.

It is another object to provide a more compact adcock DF-on-the-fly system in which the pulse compression process and signal direction vectors are generated in a single device.

It is also an object to provide a substantial reduction in the required number of components in a DF-on-the-fly system, particularly in the number of pulse-compression delay lines which constitute an expensive component.

Additional objects are to provide a reduction in the number of phase tracking signal channels to two and to provide a simplified means of controlling octantal error over a wide band.

SUMMARY

The foregoing objects have been met in an adcock DF-on-the-fly type direction finding system for finding a signal arrival angle according to the present invention comprising: an adcock type array having four antenna elements, designated for convenience as "A1", "B1", "C1", and "D1", adapted to provide respective electrical signals reflecting the received signal, the antenna elements being disposed at the vertices of a square with an electrical half diameter $\tau$ and with elements A1 and C1 and elements B1 and D1 being disposed diagonally opposite one another; first combiner means operably connected to receive electrical signals for forming a signal $\Delta 1$ which is equal to $A1-C1$ and for forming a signal equal to $A1+C1$; second combiner means operably connected to receive the electrical signals for forming a signal $\Delta 2$ which is equal to $B1-D1$ and for forming a signal equal to $B1+D1$; first summer means operably connected for forming a DF reference signal $S\phi$ equal to $A1+B1+C1+D1$; shifter means operably connected for forming a signal $-j\Delta 1$ which is equal to $\Delta 1$ shifted by $-90°$; second summer means operably connected for forming a signal S equal to $\Delta 2 - j\Delta 1$; and means operably connected for measuring the phase difference $\alpha$ between the S and $S\phi$ signals whereby the signal arrival angle of interest is determined as being approximately equal to the phase difference $\alpha$.

In the preferred embodiment, the phase difference measuring means includes a beam forming dispersive delay line (BFDDL) having a pair of inputs operably connected to receive said S and $S\phi$ signals, respectively, and four outputs placed such that they sample an output spatial interference pattern from said BFDDL at 90° intervals to produce the signals $$A = 1 + KH (\cos \alpha + j \sin \alpha)$$
$$C = 1 - KH (\cos \alpha + j \sin \alpha)$$
$$B = 1 + KH (\sin \alpha + j \cos \alpha)$$
$$D = 1 - KH (\sin \alpha + j \cos \alpha)$$

where: $H = \dfrac{\Delta 1^2 + \Delta 2^2}{S\phi}$

K is a multiplier adapted to reduce the octantal error to zero.

Additionally in the preferred embodiment, the phase difference measuring means includes means for calculating the true arrival angle $\beta$ as $$\beta = \arctan \frac{(\log |A| - \log |C|)}{(\log |B| - \log |D|)}$$

where:

$$|A| = 1 + \sqrt{(KH)^2 + 2KH \cos}$$

$$|C| = 1 + \sqrt{(KH)^2 - 2KH \cos}$$

$$|B| = 1 + \sqrt{(KH)^2 + 2KH \sin}$$

$$|D| = 1 + \sqrt{(KH)^2 - 2KH \sin}$$

DESCRIPTION OF THE PREFERRED EMBODIMENT

Figure 1:
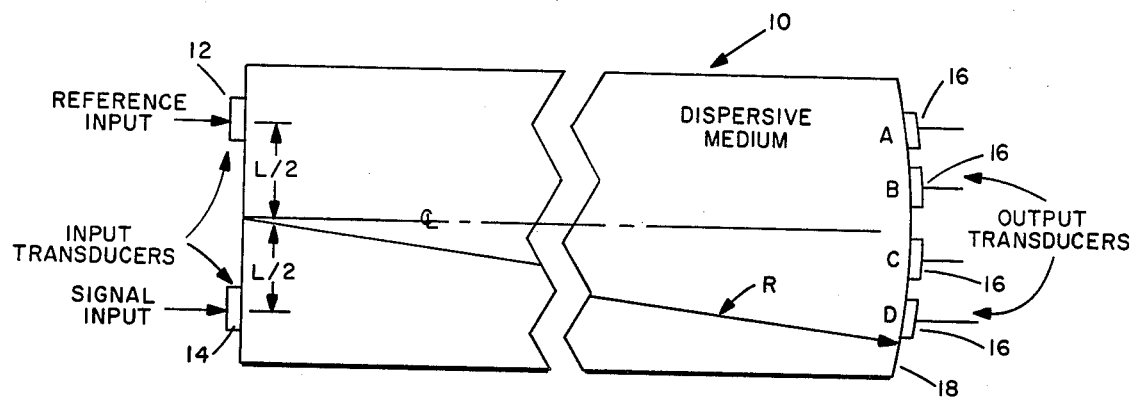
FIG. 1 is a drawing of the configuration of the beam forming dispersive delay line employed in the present invention.

Referring first to FIG. 1, a beam forming dispersive delay line (BFDDL) 10 as employed in the present invention is shown. A detailed description of the basic operation can be found in patent application Ser. No. 460,216 filed 1/24/83 entitled "Two Dimensional Transform Utilizing Ultrasonic Dispersive Delay Line" by John T. Apostolos and assigned to the common assignee of this application, the teachings of which are incorporated herein by reference.

The BFDDL 10 as employed in the present invention has two input transducers 12, 14 displaced symmetrically about the center line at a spacing of L/2. Four output transducers 16, labelled "A", "B", "C", and "D", are mounted at the output end of the BFDDL 10. The output transducers 16 are mounted on a curved output edge 18 of radius R to take advantage of a focused geometry.

The inputs to the BFDDL 10 consist of a pair of signals of equal instantaneous frequency, but an unknown phase shift, $\alpha$.

The purpose of the BFDDL 10 geometry as described is the measurement of the unknown phase shift $\alpha$.

Since, as will be seen hereinafter, the signal and reference are introduced into the BFDDL 10 at a spatial displacement of L, they cause an interference pattern which can be measured along the output edge 18 of the BFDDL 10. It is the spatial phase of this interference pattern which is used to measure the phase angle between the signal and the reference. The output transducers 18 are placed such that they sample the output spatial interference pattern at 90° intervals. The output spatial interference pattern amplitude may be computed using the TI59 program set forth hereinafter. The computation requires a number of line parameters, such as the half spacing between input transducers, L/2, and the length of the line, R. These dimensions must be expressed in wavelengths (as the unit of length) thus the center frequency phase delay must be calculated.

A practical value for input transducer 12, 14 spacing is that which allows an approximately equal spacing for the outer output transducers 16, i.e., A and D. This permits the use of a constant width BFDDL 10, i.e., the spacing of 12 and 14 is equal to the spacing of 16 A and D.

As will be seen shortly, it is the four 90° spatially displaced amplitude samples of the interference pattern which can be taken at 16 A, B, C, and D in the BFDDL 10 as described which permit the measurement of the phase shift between the signal and reference.

Figure 2:
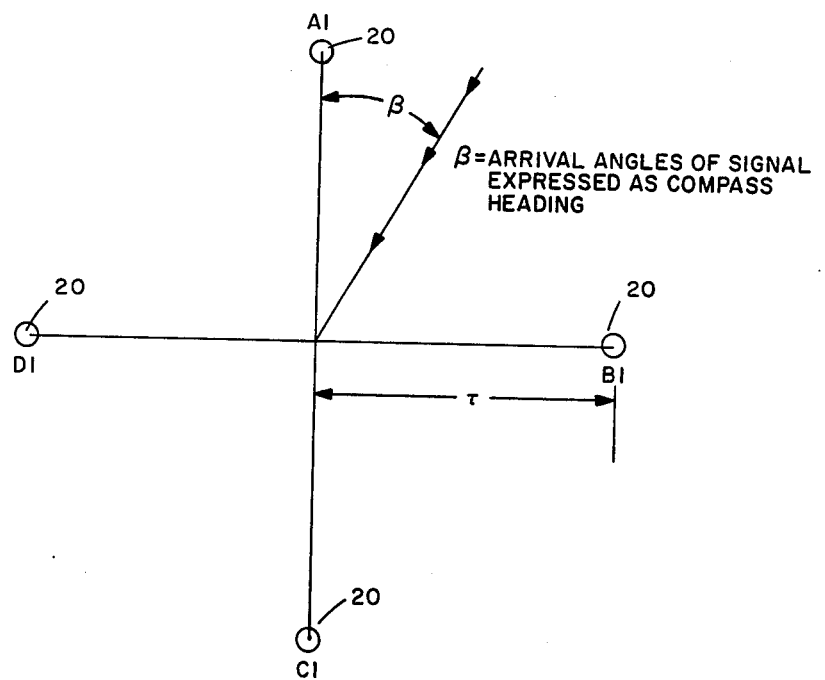
FIG. 2 is a drawing of a plan view of the adcock array employed in the present invention.
Figure 3:
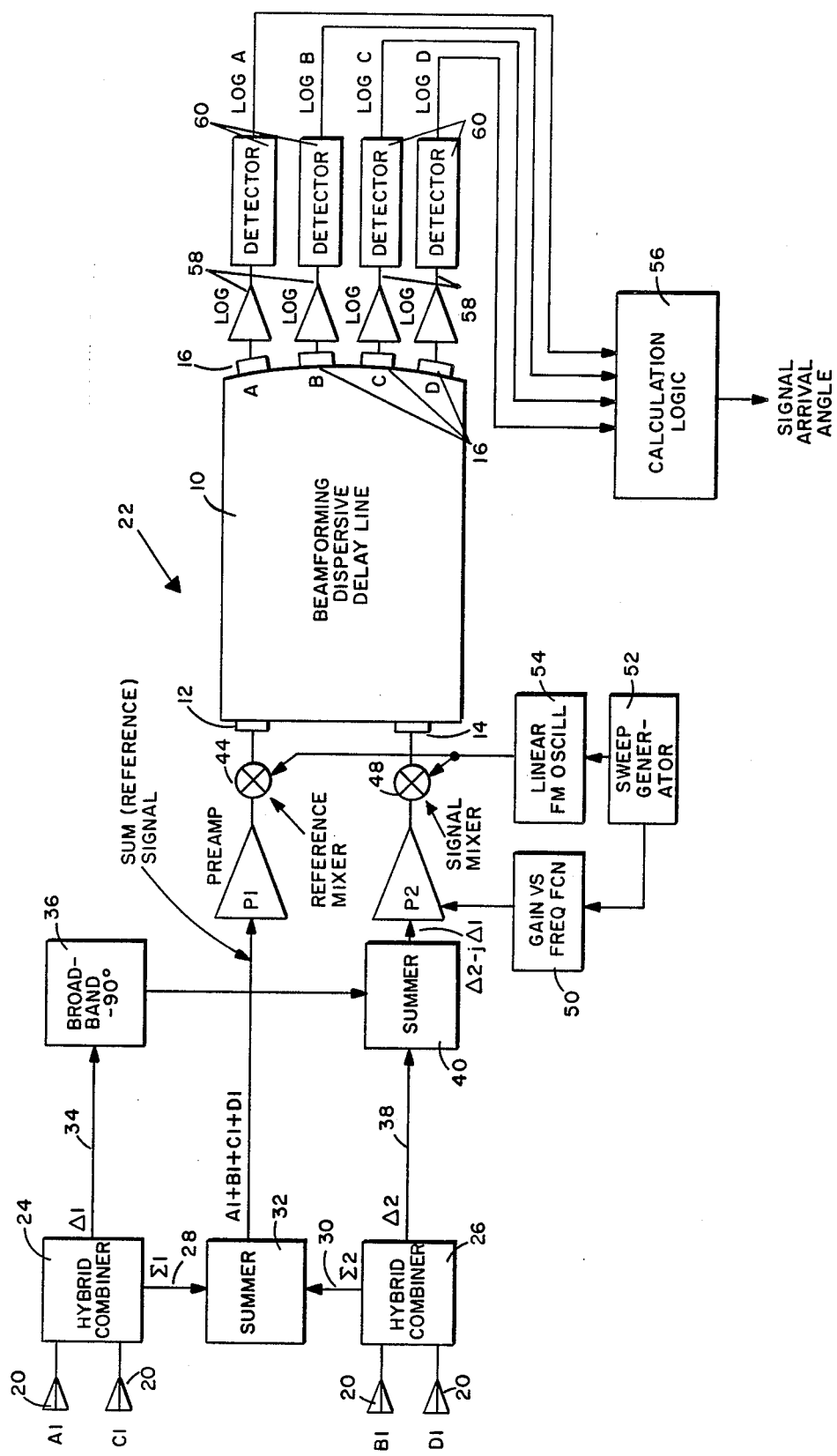
FIG. 3 is a functional block diagram of the present invention.

The embodiment of the BFDDL 10 as described above is shown incorporated into an adcock DF system according to the present invention in FIG. 3. A plan view of the adcock array layout is shown in FIG. 2. The four antenna elements 20, labelled "A1", "B1", "C1", and "D1", are located at the vertices of a square with an electrical half diameter, $\tau$. The elements 20 are connected to the inputs of the DF-on-the-fly system generally indicated as 22 in FIG. 3.

The diagonal pair electrical signals from elements 20 A1–C1 and B1–D1 are, respectively, fed to hybrid combiners 24 and 26. The sum outputs 28 and 30 of the hybrid combiners 24, 26 are summed in summer 32 to form the sum A1+B1+C1+D1 which forms the DF reference signal S$\phi$. This signal is virtually omnidirectional, its amplitude and phase virtually unaffected by the signal arrival angle.

The difference output 34 of hybrid combiner 24 is shifted $-90°$ by broadband shifter 36 and summed with the difference output 38 of hybrid combiner 26 in summer 40. The resultant signal out of summer 40 is $$S = \Delta 2 - j\Delta 1$$

where $\Delta 1$ and $\Delta 2$ are the difference signals from 34 and 38, respectively. The amplitude of S is almost independent of signal arrival angle, but its phase corresponds very closely to the arrival angle, $\beta$, shown in FIG. 2. The signal arrival angle may be found to a good approximation by measuring the phase difference between the S and S$\phi$ signals.

The reference signal S$\phi$ from summer 32 is amplified by preamp 42, passes through reference mixer 44 and is connected to the reference input transducer 12. The signal S from summer 40 is amplified by preamp 46, passes through signal mixer 48 and is connected to the signal input transducer 14.

Mathematically, the following is accomplished.

It should be noted that the difference signals $\Delta 1$ and $\Delta 2$ at the outputs 34, 38 of hybrid combiners 24 and 26 lead the sum signal S$\phi$ in phase by 90°, thus $$S = \Delta 2 - j\Delta 1$$

$$S\phi = -j(A1 + B1 + C1 + D1)$$

addition of $+90°$ shift to the above expressions yields $$S = \Delta 1 + j\Delta 2$$

$$S\phi = A1 + B1 + C1 + D1$$

From the array pattern equations:

$$\Delta 1 = j(2 \sin(\tau \cos \beta))$$

$$\Delta 2 = j(2 \sin(\tau \sin \beta))$$

$$S\phi = 2 \cos(\tau \cos \beta) + 2 \cos(\tau \sin \beta)$$

The amplitude ratio of S/S$\phi$ is thus:

$$H = \frac{\sqrt{\Delta 1^2 + \Delta 2^2}}{S\phi}$$

$$H = \frac{\sqrt{\sin^2(\tau \cos \beta) + \sin^2(\tau \sin \beta)}}{\cos(\tau \cos \beta) + \cos(\tau \sin \beta)}$$

The phase shift between S and S$\phi$, with S$\phi$ as a zero reference is:

$$= \arctan \frac{\sin(\tau \sin \beta)}{\sin(\tau \cos \beta)}$$

The output transducers 16 of the BFDDL 10 are placed in such a manner as to sample one cycle of the interference pattern created by the path differences between the signals S and Sφ in the BFDDL 10. Normalizing the amplitude of S to Sφ, the outputs of transducers 16 A, B, C, D may be expressed as $$A = 1 + KH(\cos\alpha + j\sin\alpha)$$

$$C = 1 - KH(\cos\alpha + j\sin\alpha)$$

$$B = 1 + KH(\sin\alpha + j\cos\alpha)$$

$$D = 1 - KH(\sin\alpha + j\cos\alpha)$$

$$|A| = \sqrt{1 + (KH)^2 + 2KH\cos\alpha}$$

$$|C| = \sqrt{1 + (KH)^2 - 2KH\cos\alpha}$$

$$|B| = \sqrt{1 + (KH)^2 + 2KH\sin\alpha}$$

$$|D| = \sqrt{1 + (KH)^2 - 2KH\sin\alpha}$$

where K is a multiplier selected to reduce octantal error to zero.

In general, K requires a different value at each frequency because the sum and difference pattern shapes vary with frequency. The K factor may be controlled in practice as shown in FIG. 3, by controlling the gain of preamplifier 46. Preamplifier 46 is a gain controlled amplifier. The gain vs frequency function may be a non-linear network or broken line approximation network designed to provide the proper values of K when driven by the frequency sweep function 50. In a typical practical system, the values for K may be varied with a linear ramp or sawtooth from the sweep generator 52 to a first approximation. As can be seen, the sweep generator 52 also drives the linear FM oscillator 54 providing the signal mixed in mixers 44 and 48.

Pulse compression is performed by employing a linear FM oscillator 54 matched to the dispersive characteristics of the BFDDL 10. The amplitude weighting networks, employed in the usual manner, are not shown in FIG. 3 for the sake of simplicity.

The algorithm for deriving the true arrival angles with minimum error is $$\beta \text{ calculated} = \arctan \frac{(\log |A| - \log |C|)}{(\log |B| - \log |D|)}$$

This algorithm operates independently of signal amplitude or modulation. The calculation is performed in calculation logic 56 which is provided the necessary inputs by passing the output signals from the output transducers 16 of the BFDDL 10 through log amplifiers 58 and detectors 60.

TI59 Program to Calculate the
Amplitude of the Interference Pattern
at the Output of the Delay Line
Values with respect to the device of FIG. 1:

R10 = O
R11 = R
R15 = [R cos φ]²
R16 = (D1-D2) · 360

-continued

TI59 Program to Calculate the
Amplitude of the Interference Pattern
at the Output of the Delay Line
Values with respect to the device of FIG. 1:

R12 = L/2          R20 = S
R13 = X + L/2
R14 = X − L/2

Program:

R↑    LBL B
      STO 11
      R/S
42↑   LBL C
      STO 12
      R/S
      LBL A
      STO 10
      [CE Tan X
      RCL 11]
      STO 13 STO 14
      RCL 12 SUM 13
      +/− SUM 14
      [RCL 10 Cos X
      RCL 11] X²
      STO 15
      [CE + RCL 13 X²]

√x STO 16
      [RCL 15 +

RCL 14 X²] √x
      +/− SUM 16
      360 prd 16
      [ [ [ 1 + RCL 16 Cos]X²

+ RCL 16 sin X²] √x
      ÷ 2]
      STO 20
      R/S

Comments:

| | | |
|---|---|---|
| 1. | Enter R, length of line, wavelengths | Press B |
| 2. | Enter L/2, half spacing between input transducers, wavelengths | Press C |
| 3. | Enter deviation angle from delay line axis | Press A |
| 4. | Read signal amplitude at output end normalized to max = 1.0 | |

Wherefore, having thus described my invention, I claim:

1. An adcock DF-on-the-fly type direction finding system for finding a signal arrival angle comprising:
   (a) an adcock type array having four antenna elements designated for convenience as "A1", "B1", "C1", and "D1" adapted to provide respective electrical signals reflecting the received signal, said antenna elements being disposed at the vertices of a square with an electrical half diameter τ and with said elements A1 and C1 and said elements B1 and D1 being disposed diagonally opposite one another;
   (b) first combiner means operably connected to receive said electrical signals for forming a signal Δ1 which is equal to A1−C1 and for forming a signal equal to A1+C1;
   (c) second combiner means operably connected to receive said electrical signals for forming a signal Δ2 which is equal to B1−D1 and for forming a signal equal to B1+D1;
   (d) first summer means operably connected for forming a DF reference signal Sφ equal to A1+B1+C1+D1;

(e) shifter means operably connected for forming a signal $-j\Delta 1$ which is equal to $\Delta 1$ shifted by $-90°$;

(f) second summer means operably connected for forming a signal S equal to $\Delta 2 - j\Delta 1$; and, (g) means operably connected for measuring the phase difference $\alpha$ between said S and S$\phi$ signals whereby the signal arrival angle of interest is determined as being approximately equal to said phase difference $\alpha$.

2. The direction finding means of claim 1 wherein:
said difference measuring means includes a beam forming dispersive delay line (BFDDL) having a pair of inputs operably connected to receive said S and S$\phi$ signals, respectively, and four outputs placed such that they sample an output spatial interference pattern from said BFDDL at 90° intervals to produce the signals $A = 1 + KH(\cos \alpha + j \sin \alpha)$ $C = 1 - KH(\cos \alpha + j \sin \alpha)$ $B = 1 + KH(\sin \alpha + j \cos \alpha)$ $D = 1 - KH(\sin \alpha + j \cos \alpha)$ where $$H = \frac{\sqrt{\Delta 1^2 + \Delta 2^2}}{S_\phi} \text{ and,}$$

K is a multiplier adapted to reduce the octantal error to zero.

3. The direction finding means of claim 2 wherein:
said phase difference measuring means includes means for calculating the true arrival angle $\beta$ as $$\beta = \arctan \frac{(\log |A| - \log |C|)}{(\log |B| - \log |D|)}$$

where:

$|A| = \sqrt{1 + (KH)^2 + 2 KH \cos \alpha}$ $|C| = \sqrt{1 + (KH)^2 - 2 KH \cos \alpha}$ $|B| = \sqrt{1 + (KH)^2 + 2 KH \sin \alpha}$ $|D| = \sqrt{1 + (KH)^2 - 2 KH \sin \alpha}$ 4. The method of operating an adcock DF-on-the-fly type direction finding system for finding a signal arrival angle comprising the steps of:

(a) providing an adcock type array having four antenna elements designated for convenience as "A1", "B1", "C1" and "D1" adapted to provide respective electrical signals reflecting the received signal and disposing said antenna elements at the vertices of a square with an electrical half diameter $\tau$ and with said elements A1 and C1 and said elements B1 and D1 disposed diagonally opposite one another;

(b) receiving said electrical signals and forming a signal $\Delta 1$ which is equal to $A1 - C1$ and a signal equal to $A1 + C1$;

(c) receiving said electrical signals and forming a signal $\Delta 2$ which is equal to $B1 - D1$ and a signal equal to $B1 + D1$;

(d) forming a DF reference signal S$\phi$ equal to $A1 + B1 + C1 + D1$;

(e) forming a signal $-j\Delta 1$ which is equal to $\Delta 1$ shifted by $-90°$;

(f) forming a signal S equal to $\Delta 2 - j\Delta 1$; and, (g) measuring the phase difference $\alpha$ between said S and S$\phi$ signals whereby the signal arrival angle of interest is determined as being approximately equal to said phase difference $\alpha$.

5. The method of claim 4 wherein:
said phase difference measuring step includes passing the signals through a beam forming dispersive delay line (BFDDL) having a pair of inputs operably connected to receive said S and S$\phi$ signals, respectively, and four outputs placed such that they sample an output spatial interference pattern from said BFDDL at 90° intervals to produce the signals $A = 1 + KH(\cos \alpha + j \sin \alpha)$ $C = 1 - KH(\cos \alpha + j \sin \alpha)$ $B = 1 - KH(\sin \alpha + j \cos \alpha)$ $D = 1 - KH(\sin \alpha + j \cos \alpha)$ where:

$$H = \frac{\sqrt{\Delta 1^2 + \Delta 2^2}}{S_\phi} \text{ and,}$$

K is a multiplier adapted to reduce the octantal error to zero.

6. The method of claim 5 and additionally including the step of:
calculating the true arrival angle $\beta$ as $$\beta = \arctan \frac{(\log |A| - \log |C|)}{(\log |B| - \log |D|)}$$

where:

$|A| = \sqrt{1 + (KH)^2 + 2 KH \cos \alpha}$ $|C| = \sqrt{1 + (KH)^2 - 2 KH \cos \alpha}$ $|B| = \sqrt{1 + (KH)^2 + 2 KH \sin \alpha}$ $|D| = \sqrt{1 + (KH)^2 - 2 KH \sin \alpha}$

* * * * *